(12) United States Patent
Drabarek et al.

(10) Patent No.: US 7,400,408 B2
(45) Date of Patent: Jul. 15, 2008

(54) INTERFEROMETRIC MEASURING DEVICE

(75) Inventors: Pawel Drabarek, Tiefenbronn (DE); Dominique Breider, Ecublens (CH); Marc-Henri Duvoisin, Préverenges (CH); Dominique Marchal, Vallorbe (CH)

(73) Assignee: Robert Bosch GmbH, Stuttgart (DE)

( * ) Notice: Subject to any disclaimer, the term of this patent is extended or adjusted under 35 U.S.C. 154(b) by 200 days.

(21) Appl. No.: 10/527,935

(22) PCT Filed: Mar. 28, 2003

(86) PCT No.: PCT/DE03/01032

§ 371 (c)(1), (2), (4) Date: Apr. 24, 2006

(87) PCT Pub. No.: WO2004/029544

PCT Pub. Date: Apr. 8, 2004

(65) Prior Publication Data

US 2006/0238771 A1    Oct. 26, 2006

(30) Foreign Application Priority Data

Sep. 25, 2002    (DE) .............................. 102 44 553

(51) Int. Cl.
   *G01B 9/02* (2006.01)
(52) U.S. Cl. ....................... 356/479; 356/497
(58) Field of Classification Search ............. 356/479, 356/497
   See application file for complete search history.

(56) References Cited

U.S. PATENT DOCUMENTS

| | | |
|---|---|---|
| 5,781,297 A | 7/1998 | Castore |
| 6,134,003 A * | 10/2000 | Tearney et al. ............ 356/479 |
| 6,741,355 B2 * | 5/2004 | Drabarek .................. 356/482 |
| 7,283,247 B2 * | 10/2007 | Okawa et al. ............. 356/477 |

FOREIGN PATENT DOCUMENTS

| | | |
|---|---|---|
| DE | 198 08 273 | 9/1999 |
| DE | 198 19 762 | 11/1999 |
| DE | 100 57 539 | 5/2002 |

* cited by examiner

*Primary Examiner*—Hwa S Lee
(74) *Attorney, Agent, or Firm*—Kenyon & Kenyon LLP

(57) ABSTRACT

An interferometric measuring device for recording the shape, the roughness or the clearance distance of the surface of a measured object is provided, the measuring device having a modulating interferometer, to which is supplied short-coherent radiation by a radiation source, and which has a first beam splitter for splitting the radiation supplied into a first beam component guided via a first arm, and into a second beam component guided via a second arm. One beam is shifted with respect to the other beam, with the aid of a modulating device, in terms of the beam's light phase or light frequency, and passes through a delay line. The two beams are subsequently combined at an additional beam splitter of the modulating interferometer. A measuring probe that is spatially separated from the modulating interferometer is coupled to it or able to be coupled to it via a light-conducting fiber set-up, in which probe the combined beam components are split into a measuring beam guided to the surface by a probe-optical fiber unit having a slantwise exit surface on the object side and a reference beam. An accurate surface measurement is facilitated by the angle of inclination of the exit surface to the normal of the optical probe axis amounting to at least 46°.

9 Claims, 2 Drawing Sheets

INTERFEROMETRIC MEASURING DEVICE

FIELD OF THE INVENTION

The present invention relates to an interferometric measuring device for recording the shape, the roughness or the distance to the surface of a measured object, using a modulation interferometer to which short-coherent radiation is supplied, and a measuring probe that is spatially separated from the modulation interferometer and is coupled or able to be coupled to the latter via an optical fiber device.

BACKGROUND INFORMATION

In an interferometric measuring device described in published German patent document DE 100 57 539, the interferometric measuring device is subdivided, on the one hand, into a modulation interferometer and, on the other hand, into a measuring probe having an additional interferometer unit. In the measuring probe there is provided a probe-optical fiber unit having an exit surface at the object end which, for instance, may be beveled. By the way, such an interferometric measuring device works in a manner described in greater detail in published German Patent document DE 198 19 762.

In an additional interferometric measuring device described in published German patent document DE 198 19 762, one part, the so-called modulation interferometer, is spatially separated from the actual measuring probe, and is optically connected to it via a light-conducting fiber system, so that the measuring probe may be designed as a relatively simply constructed, easily manipulable unit. A broad-band, short-coherent radiation is supplied to the modulation interferometer, which is split into two beam components at the input of the modulation interferometer with the aid of a beam splitter, of which the one is shifted in its light phase or light frequency with respect to the other, using a modulation device, such as an acousto-optic modulator. In the modulation interferometer, one of the two beam components runs through a delay element which generates an optical path difference of the two beam components which is greater than the coherence length of the short-coherent radiation. In the measuring probe, in a measuring arm, with respect to a reference arm, an additional optical path difference is generated in such a way that the path difference effected by the delay element is compensated for, and, consequently, an interference is created between the reference radiation coming from the reference plane of the reference arm and the radiation coming back from the object surface in the measuring arm, which interference is subsequently analyzed so as to ascertain the desired surface property (shape, roughness, clearance distance) via a phase evaluation. In the measuring probe, the measuring arm and the reference arm are situated in one exemplary embodiment in one common light path (common path), a partially transmitting optical element being provided for forming the measuring arm and the reference arm.

A similar interferometric measuring device having such a modulation interferometer and a measuring probe connected to it via a light-conducting fiber system is also described in published German patent document DE 198 08 273. In a beam splitting and radiation detecting unit, using a receiving equipment, the radiation brought to interference is split into radiation components of different wavelength, so as to form therefrom a synthetic wavelength and to increase the measuring range.

In the interferometric measuring devices named above, which are based on heterodyne interferometry, but which utilize the properties of a broad-band, short-coherent radiation, the modulation interferometer, designed as a Mach-Zehnder interferometer, has a system of classical optical components, such as collimation optics lying upstream of the input end of the beam splitter, with the beam splitter and reflecting mirror at the input end and the output end, respectively. In this context, the beam components experience several reflections at the beam splitter surfaces and at the mirrors, before they are coupled into the optical light-conducting fiber system. The optical components have to be positioned with great accuracy, since the effect of every angle error is doubled by the reflection. In this context, it is difficult to ensure the durability of a calibration. In connection with fitting in a glass plate to compensate for optical asymmetries, additional difficulties come about during the calibration. A costly construction is connected with these difficulties, an exact adjustment to the properties of the measuring probe being also required.

An object of the present invention is making available an interferometric measuring device which permits achieving as accurate as possible a measurement, using a simplified construction.

SUMMARY

According to the present invention, it is provided that the angle of inclination of the exit surface of the probe-optical fiber unit with respect to the normal of the optical probe axis is at least 46°.

Using this design of the exit surface, one achieves an optimal coupling behavior in the case of right-angled beam deflection in this transitional region of the measuring beam guided to the surface of the measured object and returning from it, whereby the accuracy of the measurement is substantially favored, especially in inaccessible, tight hollow spaces.

An additional improvement may be achieved by making the angle of inclination at least 48°.

Furthermore, interferences are suppressed by providing a jacket-like covering of an object-end section of the probe optical fiber unit with an anti-reflection treatment.

Additional improvement to the coupling of the radiation may be achieved by providing the exit surface with a reflection treatment.

An example embodiment of the present invention is advantageous in that a partially transmitting region between a probe fiber and a fiber section of the measuring probe is formed with the aid of an exit surface of a probe fiber that is slanted at an exit angle with respect to the optical probe axis, and with the aid of an entrance surface of a fiber section following on the object end that is also slanted at an exit angle with respect to the optical probe axis. Furthermore, a wedge-shaped gap is formed between the exit surface and the entrance surface, and the exit surface and the entrance surface are inclined in the same direction with respect to the probe axis.

In this regard, it is advantageous that the exit angle and the entrance angle are selected so that a Fresnel reflection is effected. The radiation transmission for reliable measuring results is favored by the exit angle α being between 5° and 8°, and the entrance angle being between α and 0°.

An additional advantageous example embodiment provides that the probe fiber and the fiber section are accommodated axially aligned in a tubule-shaped accommodation, which is surrounded by an outer tube of the measuring probe. On the end face of the accommodation, that faces away from the measured object, a positioning element is provided that surrounds the probe fiber and is also accommodated concentrically to the tube, and the fiber section is fixed in the object-end, front part of the accommodation, and the probe fiber is fixed in the rear part of the accommodation that is distant from the object, and/or in the tube.

Furthermore, one favorable example embodiment is achieved in that the front part of the accommodation is separated from the rear part of the accommodation by diametrically opposite gaps, one gap being limited at the rear in the elongation of the slanted exit surface of the probe fiber, and the other gap being limited on the front in the elongation of the slanting entrance surface. In addition, the front part and the rear part of the receptacle are enclosed by a common sleeve-shaped retaining ring, which is surrounded on the outside by the tube, and that a front section of the fiber section has a smaller diameter compared to its rear section.

Another example embodiment provides that the modulation interferometer has at least partially a polarization-maintaining, light-conducting structure in the form of an optical fiber conductor or integrated optics, the light-conducting structure being interrupted at at least one arm.

DETAILED DESCRIPTION

Figure 1:
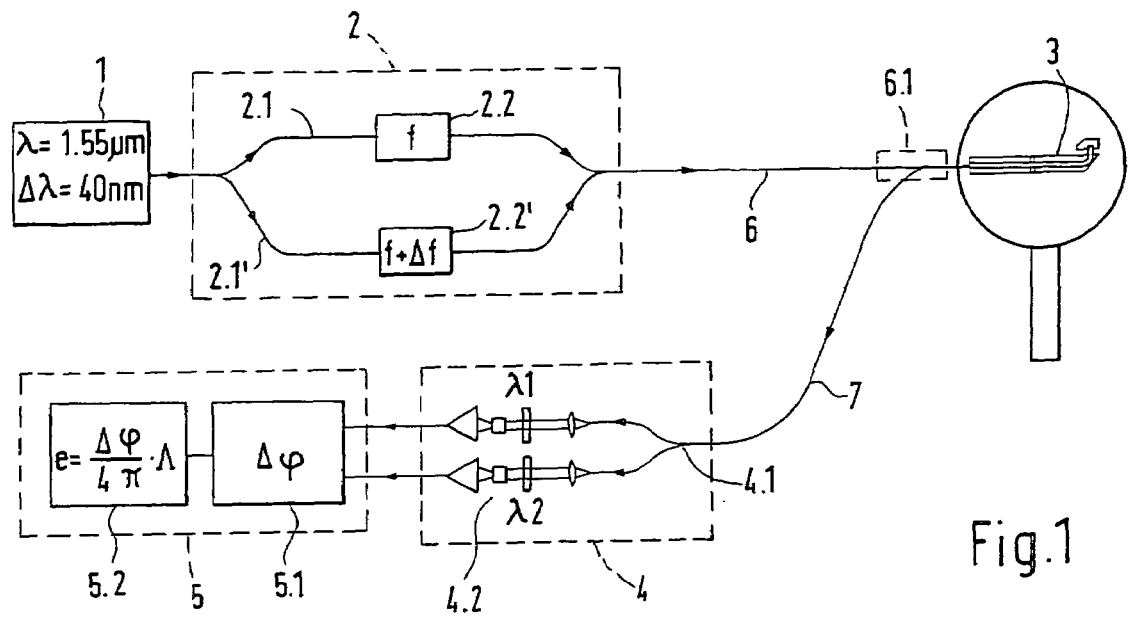
FIG. 1 shows a schematic representation of an overall construction of an interferometric measuring device having a modulation interferometer and a measuring probe.
Figure 2:
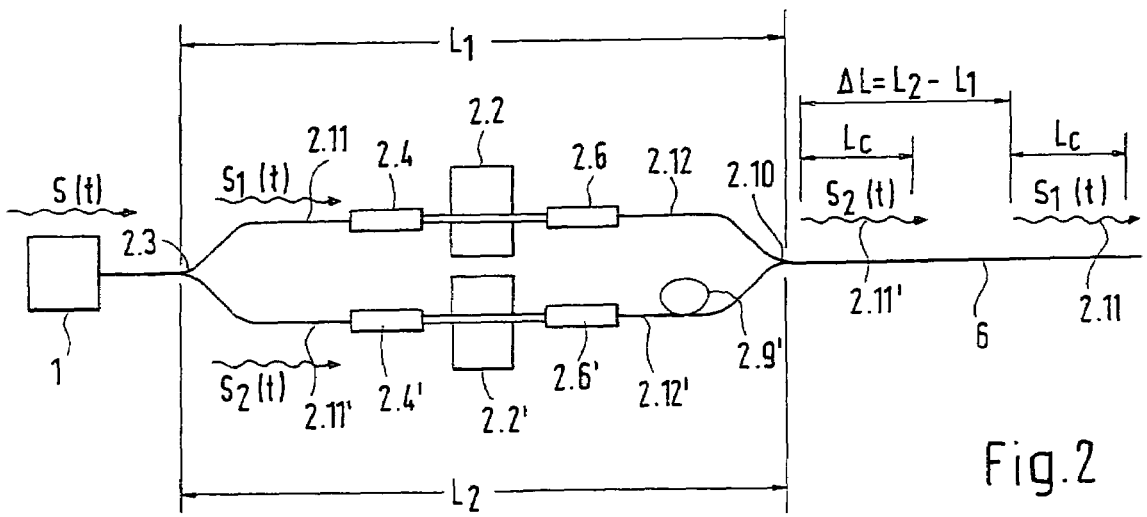
FIG. 2 shows a more detailed illustration of an example embodiment of the modulation interferometer shown in FIG. 1.

As shown in FIG. 1, the interferometric measuring device using the principle of heterodyne interferometry has a broadband, short-coherent light source 1, whose radiation is supplied to a so-called modulation interferometer 2. In modulation interferometer 2, which is shown in greater detail in FIG. 2, radiation s(t) is split at a first beam splitter 2.3 into a first beam component 2.1 guided via a first arm, having a partial radiation $s_1(t)$, and a second beam component 2.1' guided via a second arm, having a partial radiation $S_2(t)$. The two beam components are recombined at the exit side at an additional beam splitter 2.10, and from there the recombined beam is conducted via a light-conducting fiber device 6 to a distant measuring probe 3. From measuring probe 3, which is constructed, for example, as a Fizeau interferometer or a Mirau interferometer, the radiation subsequently reaches, via an additional light-conducting fiber device 7, a receiver device 4 having a beam splitting unit 4.1 and downstream photoelectric receivers 4.2, in which a conversion into electrical signals takes place. In a downstream evaluation unit 5, having a phase detector 5.1 and a computing unit 5.2, the properties of the measuring surface picked up using measuring probe 3 (such as roughness, shape, clearance distance) are then ascertained.

Modulation interferometer 2 is designed as a Mach-Zehnder interferometer, the two arms in connection to first beam splitter 2.3 having first and second entrance-side light-conducting fibers 2.11, 2.11', and first and second exit-side light-conducting fibers 2.12, 2.12', which lead to additional beam splitter 2.10. First beam splitter 2.3 is, in this case, formed in an optical fiber, by which the radiation coming from light source 1 is advanced. At the exit of the coupler thus formed, the beam components are collimated with the aid of lens-type coupling elements 2.4, 2.4', and the two collimated beam components pass through a first or a second modulating unit 2.2, 2.2' in the form of, e.g., an acoustooptical modulator, a fiber optic piezo modulator or a thermal phase modulator, the modulating units 2.2, 2.2' being advantageously able to be developed also as integrated optical components. In order to correct the chromatic dispersion, at least one of beam components 2.1, 2.1' passes through a glass plate which is situated in a first or a second light path. The choice of the positioning of the glass plate and/or its thickness is determined by calculation. In their further course, first beam component 2.1 and second beam component 2.1' are conducted to a first or a second lens-type light guide element 2.6, 2.6' and coupled into the first or the second exit-side light-conducting fiber 2.12, 2.12'. First and second exit-side light-conducting fiber 2.12, 2.12' have different optical path lengths, to the extent that the optical path difference $\Delta L=L_2-L_1$ between the two arms is greater than the coherence length of the short-coherent radiation s(t). One of the lens-type coupling elements 2.4, 2.4' or light-conducting elements 2.6, 2.6', for example, light-conducting element 2.6', may be fastened to a calibrating device, using which the optical path difference $\Delta L$ may be adjusted, by hand or with the aid of a motor, for instance, while using a micrometer bench, in such a way that the path difference $\Delta L$ between the two arms is tuned to that of measuring probe 3 so as to effect interference using measuring probe 3. Light-conducting fibers 2.11, 2.11', 2.12, 2.12' used are monomode. Besides, they may be apolarization-receiving, especially if light source 1 is polarized and/or if modulating units 2.2, 2.2' are formed of double-refractive crystals and/or if installation at the coupling locations does not yield satisfactory stability with respect to the polarization direction in the two interferometer arms. To achieve the optical path difference, an optical alternate route (delay line) 2.9' is provided, for example, in second exit-side light-conducting fiber 2.12'.

Probe 3, which is used to detect the object surface, which probe is designed, for instance, as a Fizeau interferometer or a Mirau interferometer, has a reference branch having a reference plane and a measuring branch leading to the object surface, optical path differences of which two branches are selected so that the path difference generated in modulating interferometer 2 is compensated for, so that the measuring beam coming from the object surface and the reference beam coming from the reference plane interfere when they are superposed. The interfering radiation is supplied to beam splitting unit 4.1 for spectral partitioning into components of different wavelengths, and the split components are subsequently supplied to the allocated photoelectric receivers 4.2. The desired surface property is ascertained from the interfering radiation and the electrical signals obtained from it by evaluating the phase differences, by using phase detector 5.1 and subsequent computing unit 5.2. In this context, the evaluated phase difference is created by the frequency difference, generated by first or second modulating unit 2.2, 2.2', which, corresponding to the heterodyne method, is relatively low with respect to the fundamental frequency. The calculation is carried out according to the formula:

$$\Delta\phi = 2\pi \cdot (2e/\Lambda) + \phi_0$$

where $\phi_0$ is a constant, $\Lambda=\lambda_1\cdot\lambda_2/(\lambda_2-\lambda_1)$ is the synthetic wavelength of the measuring device,
$\lambda_1$ is the wavelength at a first photoelectric receiver,
$\lambda_2$ is the wavelength at a second photoelectric receiver,
e is the measuring distance.

From this, using evaluation unit 5, the respective recorded clearance distance of the surface at a measuring point is determined from the relationship:

$$e = \Delta\phi \cdot (2\pi) \cdot (\Lambda/2)$$

Distance measure e is thus determined from a measurement of the phase between two electrical signals, and therefore the measurement is independent of the optical intensity received by the photodiodes.

Figure 3:
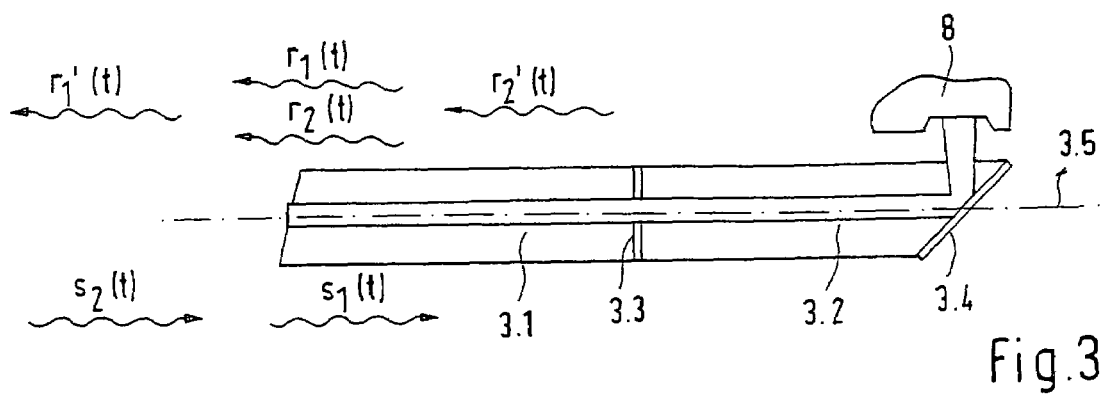
FIG. 3 shows a side view of the measuring probe and the measured object with a representation of the radiation error in offset.

FIG. 3 shows a fiber part of the measuring probe, e.g., designed as a Mirau interferometer, having a monomode light-conducting fiber, and the path displacement of the incident radiation $s_2(t)$ and $s_1(t)$, as well as the retracing radiation components $r_1'(t)$, $r_1(t)$, $r_2(t)$ and $r_2'(t)$ from the surface of measuring object 8 and a partially transmitting region 3.3 between an object-side exit surface 3.31 (see FIG. 4) of a probe fiber 3.1 and an entrance surface 3.32 (see FIG. 4), farther away from the object, of a fiber section 3.2. The retracing portions of radiation $r_1'(t)$ and $r_1(t)$ come about, in this context, from the radiation $s_1(t)$ which has passed through the arm of modulating interferometer 2 without the alternate route, portion of radiation $r_1'(t)$ being reflected by partially transmitting region 3.3 and portion of radiation $r_1(t)$ being reflected by the surface of measured object 8. By contrast, the retracing portions of radiation $r_2(t)$ and $r_2'(t)$ come about from the radiation $s_2(t)$ of modulating interferometer 2 which has passed through the optical alternate route, retracing portion of radiation $r_2(t)$ having been reflected by partially transmitting region 3.3 and retracing portion of radiation $r_2'(t)$ having been reflected by the surface of measured object 8. It is shown that, corresponding to the compensation of the path difference $\Delta L$ formed in modulating interferometer 2 by measuring probe 3, only the retracing portions of radiation $r_1(t)$ and $r_2(t)$ lie within the coherence length and interfere with each other.

In the exemplary embodiment shown in FIG. 3, object-side exit surface 3.4 of fiber section 3.2 is inclined at an angle of 45° with respect to optical probe axis 3.5. A reflective metallic or dielectric coating is applied to exit surface 3.4. The radiation is bent in this manner essentially at a right angle and guided to the surrounding surface of the object, and the radiation reflected by the surface reenters the light-conducting fiber via exit surface 3.4.

Figure 4:
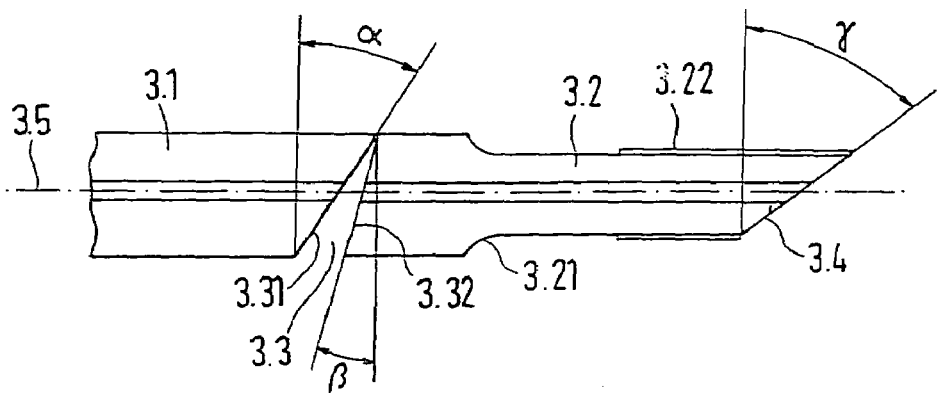
FIG. 4 shows a schematic side-view representation of a fiber part of the measuring probe.
Figure 5:
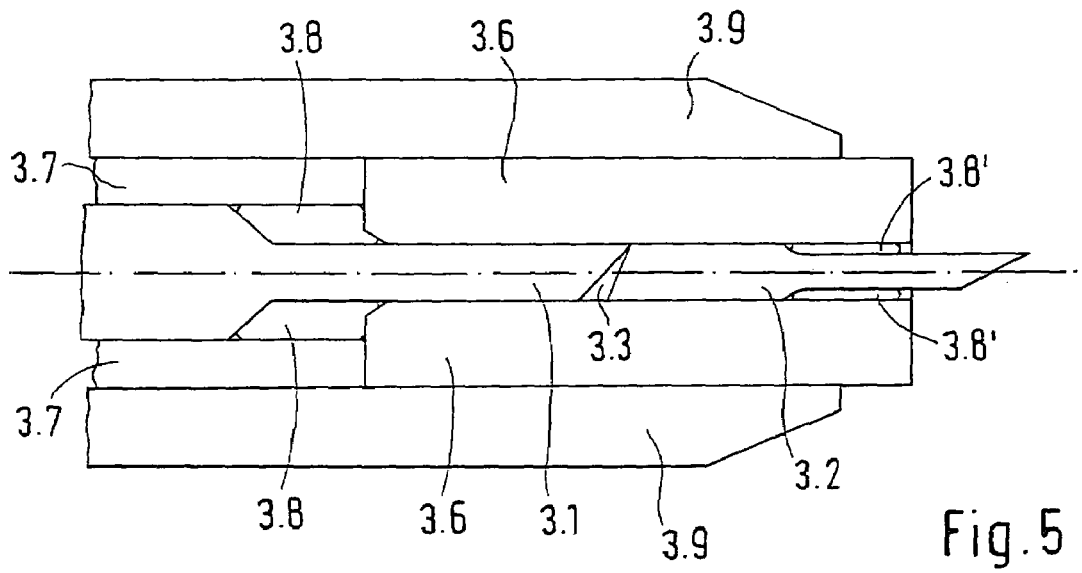
FIG. 5 shows a schematic illustration of the front section of the measuring probe.
Figure 6:
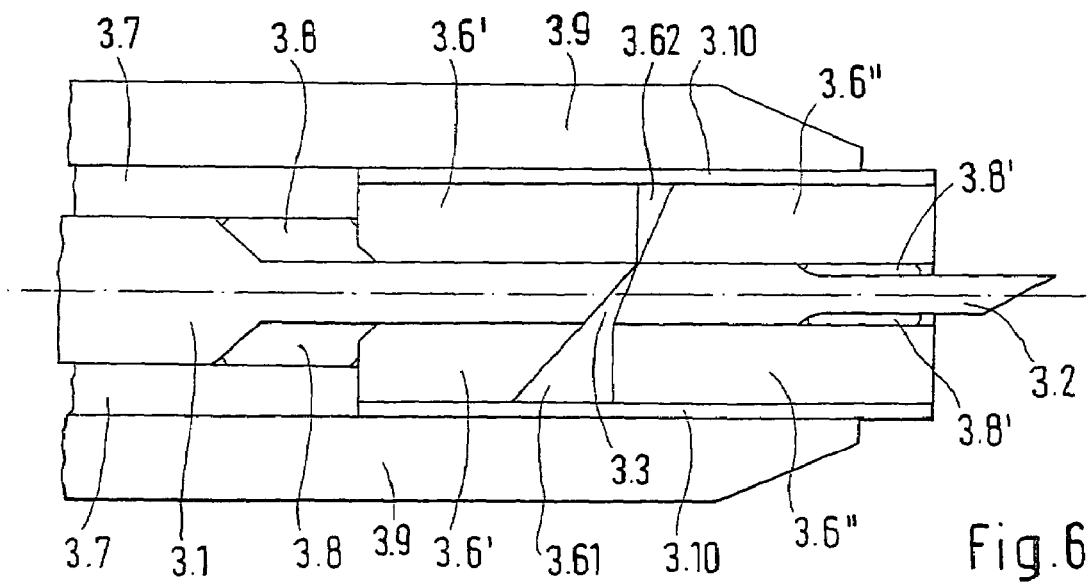
FIG. 6 shows a schematic illustration of a further example embodiment of the front section of the measuring probe.

As shown in FIGS. 4 to 6, partially transmitting region 3.3 is formed between exit surface 3.31 of probe fiber 3.1 and entrance surface 3.32 of fiber section 3.2 by an inclination of exit surface 3.31 at an angle α with respect to the normal of probe axis 3.5, and by an inclination of entrance surface 3.32 of fiber section 3.2 at an angle β with respect to the normal of probe axis 3.5, the angle α being greater than the angle β, and a wedge-shaped gap formed between the exit surface 3.31 and the entrance surface 3.32. The alignment of the inclination with respect to the normal is oriented in the same manner towards the object in the case of exit surface 3.31 and entrance surface 3.32. Angle α of exit surface 3.31 is selected so that the radiation flow of the Fresnel reflection on exit surface 3.31 is not guided by probe fiber 3.1. For a monomode light-conducting fiber having a numerical aperture of 0.12, the angle α is advantageously about 6°. Angle β is selected so that the radiation flow of the Fresnel reflection is guided onto entrance surface 3.32 of fiber section 3.2 by probe fiber 3.1, the extent of the radiation flow that is to be coupled into probe fiber 3.1 being taken into consideration. If angle β is equal to 0°, the coupling rate amounts to about 3.6%. If angle β runs counter to angle α, the degree of coupling tends toward 0. If angle β tends counter to angle α, the transmission for this transition and a retracing radiation goes toward 86%. If, however, angle β is equal to 0°, the transmission amounts to about 60%. A numerical aperture of 0.12 results, for example, at a wavelength of 1.550 nm and a diameter of 10.4 μm. Angle α should not be selected to be less than about 5°.

The reflection treatment of exit surface 3.4 of fiber section 3.2 may be reduced or avoided if exit angle γ (see FIG. 4) is increased so as to achieve total reflection at exit surface of 7. This is the case, for instance, in the case of a monomode light-conducting fiber having a numerical aperture of 0.12, at an exit angle γ that is above 48°.

At the object-side end region of fiber section 3.2, an anti-reflection treatment 3.22 may be provided on the outer surface (cladding), in order to reduce the sensitivity with respect to the Fresnel reflection, or exit angle γ may be enlarged to the extent that the radiation flow of this reflection is no longer coupled into fiber section 3.2.

As shown in FIG. 5, probe fiber 3.1 and fiber section 3.2 may be accommodated in the same tubule-type accommodation 3.6 and brought into contact. Accommodation 3.6 is the same that is used for connectors of monomode light-conducting fibers. Accommodation 3.6 is inserted into a tube 3.9 of the measuring probe 3 that surrounds it. On the inside of tube 3.9, on the end face of accommodation 3.6 lying away from the object, there is subsequently also a positioning piece 3.7 for guiding and preadjusting probe fiber 3.1. Fiber section 3.2 is fixed on the inside of the accommodation with the aid of adhesives 3.8', while probe fiber 3.1 is fixed in accommodation 3.6 and/or positioning piece 3.7 with the aid of adhesives 3.8.

Another procedure for aligning and fixing probe fiber 3.1 and fiber section 3.2 in probe 3 is shown in FIG. 6. Probe fiber 3.1 is introduced into a rear section 3.6' of tubule-type accommodation 3.6, and the front end face of rear section 3.6' and of exit surface 3.31 of probe fiber 3.1 are polished at the desired angle, the front end face in the region of the front-most edge of probe fiber 3.1 being aligned normal to optical axis 3.5 of probe fiber 3.1. Accordingly, the rear end face of a front section 3.6" of accommodation 3.6 is polished corresponding to the desired entrance surface 3.32 of fiber section 3.2, the region of the rear end face of front section 3.6" of accommodation 3.6, which is adjacent to the hindmost edge of fiber section 3.2, being aligned normal to optical axis 3.5 of probe fiber 3.1. Between rear section 3.6' and front section 3.6" of accommodation 3.6 there comes about, in this context, the set-up shown in FIG. 6 in longitudinal section. The two sections 3.6' and 3.6" of accommodation 3.6 are axially aligned with each other using a retaining ring 3.10 that is applied, for example slotted, and inserted into tube 3.9. Furthermore, in tube 3.9 there is also inserted, in turn, bordering on the rear end face of accommodation 3.6, a concentric positioning piece 3.7 for calibrating and prefixing probe fiber 3.1, as in the exemplary embodiment according to FIG. 5. The fixing of probe fiber 3.1 and of fiber section 3.2 using adhesives 3.8, 3.8' thus also takes place corresponding to the exemplary embodiment according to FIG. 5, fiber section 3.6 being fixed in front section 3.6" of accommodation 3.6.

It is also possible to align sections 3.6' and 3.6" by inserting them into a V-shaped profile. Because the two sections 3.6', 3.6" of accommodation 3.6 are inserted separately, the outermost end of measuring probe 3 may be changed immovably and corresponding to the characteristic of the measured object, the same probe fiber 3.1 being retained.

As FIGS. 4 to 6 also show, the outer section of fiber section 3.2 is reduced in its diameter, so that it may also be introduced into tight holes of a measured object 8, whose diameter amounts to less than 130 μm, for example. The diameter of a monomode light-conducting fiber having outer treatment (cladding) usually amounts to 125 μm. The diameter may be reduced with the aid of chemical treatment using an appropriate acid or of heat treatment, so as to obtain a desired tapering 3.21. Antireflecting treatment 3.22 is then undertaken in the region of the section of lower diameter. These measures, too, contribute to ability to undertake reliable measurements even in tight recesses of a measured object 8.

What is claimed is:

1. An interferometric measuring device for measuring at least one of a shape, a roughness, and a clearance distance of a surface of a measured object, comprising:
    a radiation source;
    a modulation interferometer coupled to the radiation source, wherein a short-coherent radiation is supplied to the interferometer by the radiation source, and wherein the interferometer includes:
        a first beam splitter for splitting the radiation supplied into a first beam component and a second beam component;
        a first arm for guiding the first beam component;
        a second arm for guiding the second beam component;
        a modulating device coupled to the first arm and the second arm downstream from the first arm and the second arm, the modulating device shifting one of a phase and a frequency of one of the first beam component and the second beam component relative to other of the first beam component and the second beam component;
        a delay line coupled to the modulating device downstream from the modulating device and transmitting one of the first beam component and the second beam component; and
        a second beam splitter positioned downstream of the delay line and combining the first beam component and the second beam component;
    a measuring probe spatially separated from the modulation interferometer and coupled to the interferometer by a light-conducting fiber set-up downstream from the modulation interferometer, wherein the measuring probe includes a probe-optical fiber unit having a slanted exit surface on an object side, the probe-optical fiber unit splitting the combined first beam component and the second beam component into a measuring beam guided to the surface and a reference beam, wherein the measuring beam reflected at the surface and the reference beam reflected at a reference plane are superposed;
    a receiver device coupled to the measuring probe for converting received radiation into electrical signals; and
    an evaluation device coupled to the receiver device for evaluating the electrical signals on the basis of a phase difference;
    wherein an angle of inclination of the exit surface to the normal of a longitudinal optical probe axis of the probe-optical fiber unit is at least 46°;
    wherein the probe-optical fiber unit includes a first section and a second section, the second section being proximate to the measured object, wherein an exit surface of the first section slants at an exit angle with respect to an optical probe axis of the probe-optical fiber unit, and wherein an entrance surface of the second section slants at an entrance angle with respect to the optical probe axis, wherein a partially transmitting region in the form of a wedge-shaped gap is formed between the exit surface of the first section and the entrance surface of the second section, and wherein the exit surface of the first section and the entrance surface of the second section are inclined in the same direction with respect to the optical probe axis.

2. The device as recited in claim 1, wherein the angle of inclination is at least 48°.

3. The device as recited in claim 1, wherein an end section of the probe-optical fiber unit proximate to the measured object has a jacketed covering including an antireflection material.

4. The device as recited in claim 1, wherein the exit surface is provided with a reflection coating.

5. The device as recited in claim 1, wherein the exit angle and the entrance angle are selected so that a Fresnel reflection is achieved.

6. The device as recited in claim 1, wherein the exit angle is between 5° and 8°, and the entrance angle is between the exit angle and 0°.

7. The device as recited in claim 1, wherein the first section and the second section are axially aligned and accommodated in a tubule-shaped accommodation that is surrounded by an outer tube, and wherein a positioning element is provided at an end section of the accommodation that is distant from the measured object, the positioning element surrounding the first section, and wherein the positioning element is accommodated concentrically within the tube, and wherein the second section is fixed within a front part of the accommodation proximate to the measured object, and wherein the first section is fixed within a rear part of the accommodation distant from the measured object.

8. The device as recited in claim 7, wherein the front part of the accommodation is separated from the rear part of the accommodation by two gaps that are substantially diametrically opposite, a rear of a first gap being defined by an extension of the slanting exit surface of the first section of, and a front of a second gap being defined by an extension of the slanting entrance surface of the second section, and wherein the front part and the rear part of the accommodation are surrounded by a common sleeve-shaped retaining ring that is surrounded by the tube, and wherein a front portion of the second section has a lesser diameter compared to a rear portion of the second section.

9. The device as recited in claim 1, wherein the modulating interferometer includes at least partially a polarization-maintaining light-conducting structure in the form of one of an optical fiber conductor and integrated optics, and wherein light conduction within at least one of the first arm and the second arm is interrupted.

* * * * *